(12) United States Patent
Wu

(10) Patent No.: US 11,130,390 B2
(45) Date of Patent: Sep. 28, 2021

(54) VEHICLE SUN VISOR

(71) Applicant: KASAI KOGYO CO., LTD., Kanagawa (JP)

(72) Inventor: Shan Wu, Zama (JP)

(73) Assignee: KASAI KOGYO CO., LTD., Kanagawa (JP)

( * ) Notice: Subject to any disclaimer, the term of this patent is extended or adjusted under 35 U.S.C. 154(b) by 2 days.

(21) Appl. No.: 16/755,988

(22) PCT Filed: Jun. 1, 2018

(86) PCT No.: PCT/JP2018/021127
§ 371 (c)(1),
(2) Date: Apr. 14, 2020

(87) PCT Pub. No.: WO2019/229967
PCT Pub. Date: Dec. 5, 2019

(65) Prior Publication Data
US 2020/0298676 A1    Sep. 24, 2020

(51) Int. Cl.
*B60J 3/02*    (2006.01)
(52) U.S. Cl.
CPC .......... *B60J 3/0239* (2013.01); *B60J 3/0252* (2013.01); *B60J 3/0278* (2013.01)
(58) Field of Classification Search
CPC ....... B60J 3/0239; B60J 3/0252; B60J 3/0278
USPC ...................................... 296/97.11
See application file for complete search history.

(56) References Cited

U.S. PATENT DOCUMENTS

| 5,653,490 A | 8/1997 | Fink et al. |
| 6,612,637 B1 * | 9/2003 | Crotty, III .............. B60J 3/0278 296/97.1 |
| 6,692,059 B1 * | 2/2004 | Mills ..................... B60J 3/0208 296/97.1 |
| 7,798,551 B2 | 9/2010 | Okazaki et al. |

FOREIGN PATENT DOCUMENTS

| CN | 101628537 B | 5/2014 |
| EP | 2145789 B1 | 5/2018 |
| JP | 2000-168357 A | 6/2000 |
| JP | 2001-130255 A | 5/2001 |
| JP | 2005-035419 A | 2/2005 |
| JP | 2010-023545 A | 2/2010 |
| KR | 20020048739 A | 6/2002 |

OTHER PUBLICATIONS

International Search Report for International Application No. PCT/JP2018/021127 dated Sep. 4, 2018, Japan, 2 pages.

* cited by examiner

*Primary Examiner* — Joseph D. Pape
(74) *Attorney, Agent, or Firm* — United IP Counselors, LLC

(57) ABSTRACT

A vehicle sun visor which attains desired operation performance is provided. The vehicle sun visor includes a sun visor body having a hollow structure formed of a pair of core members opposed to each other; a shaft configured to support the sun visor body on the vehicle body; and a support member mounted on the shaft so as to be rotatable about the axis of the shaft while being restricted in shifting in the axial direction of the shaft. In this case, the support member and part of the shaft are housed inside the sun visor body. One core member includes a pair of guide parts configured to hold the support member from both sides, to guide shifting of the support member in the axial direction of the shaft.

7 Claims, 5 Drawing Sheets

VEHICLE SUN VISOR

CROSS-REFERENCE TO RELATED APPLICATIONS

This application is a National Stage Entry application of PCT International Application No. PCT/JP2018/021127, filed on Jun. 1, 2018, the entire contents of which are hereby incorporated by reference.

BACKGROUND

1. Technical Field

The present invention relates to a vehicle sun visor.

2. Description of the Background

On the front side in a vehicle roof part, a vehicle sun visor for shielding light such as sunlight entering the cabin is provided. A known vehicle sun visor of this type includes a shaft configured to support a sun visor body on the vehicle body. The shaft is provided with a support member. The support member is allowed to slide along a guide part provided in a hollow part of the sun visor body. The sliding of the support member allows the sun visor body to slide in the axial direction of the shaft.

For example, Japanese Unexamined Patent Application Publication No. 2010-023545 (hereinafter referred to as "Patent Literature 1") discloses a vehicle sun visor which provides the user with excellent operability in sliding the sun visor body. The vehicle sun visor includes: a sun visor body having a hollow structure in which two resin core members are folded on each other by a hinge part; and a support assembly and a shaft provided in the sun visor body. In order to adjust the slide resistance occurring between the inner surfaces of the resin core members and the support assembly to a proper range, the resin core members abutting on the support assembly are each provided with a projecting rib in the slide direction of the inner surface of each core member.

BRIEF SUMMARY

According to the scheme disclosed in Patent Literature 1, the support member is supported by the ribs respectively provided at the pair of core members. The set of ribs respectively provided at the core members realizes the function of transferring the rotation operation force in the user's vertically rotating the sun visor body and the function of generating the slide resistance in in the user's sliding the sun visor body. In this case, the rotation operation force and the slide resistance are determined by the force of the separate core members (the set of ribs) holding the support member from both sides, which makes it difficult to properly adjust the force and the resistance. That is, desired operation performance may not be attained.

The present invention has been made in view of the foregoing, and an object of the present invention is to provide a vehicle sun visor which attains desired operation performance.

In order to solve the problem, the present invention provides a vehicle sun visor including: a sun visor body having a hollow structure formed of a pair of core members opposed to each other, a shaft configured to support the sun visor body on a vehicle body; and a support member mounted on the shaft so as to be rotatable about an axis of the shaft while being restricted in shifting in an axial direction of the shaft. In this case, the support member and part of the shaft are housed inside the sun visor body. One of the core members includes a pair of guide parts configured to hold the support member from both sides, to guide shifting of the support member in the axial direction of the shaft.

Here, in the present invention, the pair of guide parts preferably includes a rail member extending in the axial direction of the shaft, and an abutting member provided so as to oppose to the rail member and abut on the support member.

In the present invention, the sun visor body preferably further includes a plurality of engagement parts formed of a catch part and a caught part respectively provided at the pair of core members to engage with each other, the engagement parts being arranged along the rail member.

In the present invention, the support member preferably includes a mating part being groove-like and slidably fitting to the rail member. The mating part preferably includes: a pair of sliding walls configured to hold a vertical wall surface of the rail member from both sides; and a coupling wall coupling the pair of sliding walls to each other. The one of the sliding walls preferably has a plane shape inclined relative to the vertical wall surface of the rail member.

In the present invention, other one of the core members preferably further includes a lock member configured to retain the support member shifted in the axial direction of the shaft to reach an end position at the end position. The lock member is preferably formed of a thin plate-like member having its both ends coupled and its intermediate part curved in a convex manner.

The vehicle sun visor of the present invention attains desired operation performance.

DETAILED DESCRIPTION

Figure 1:
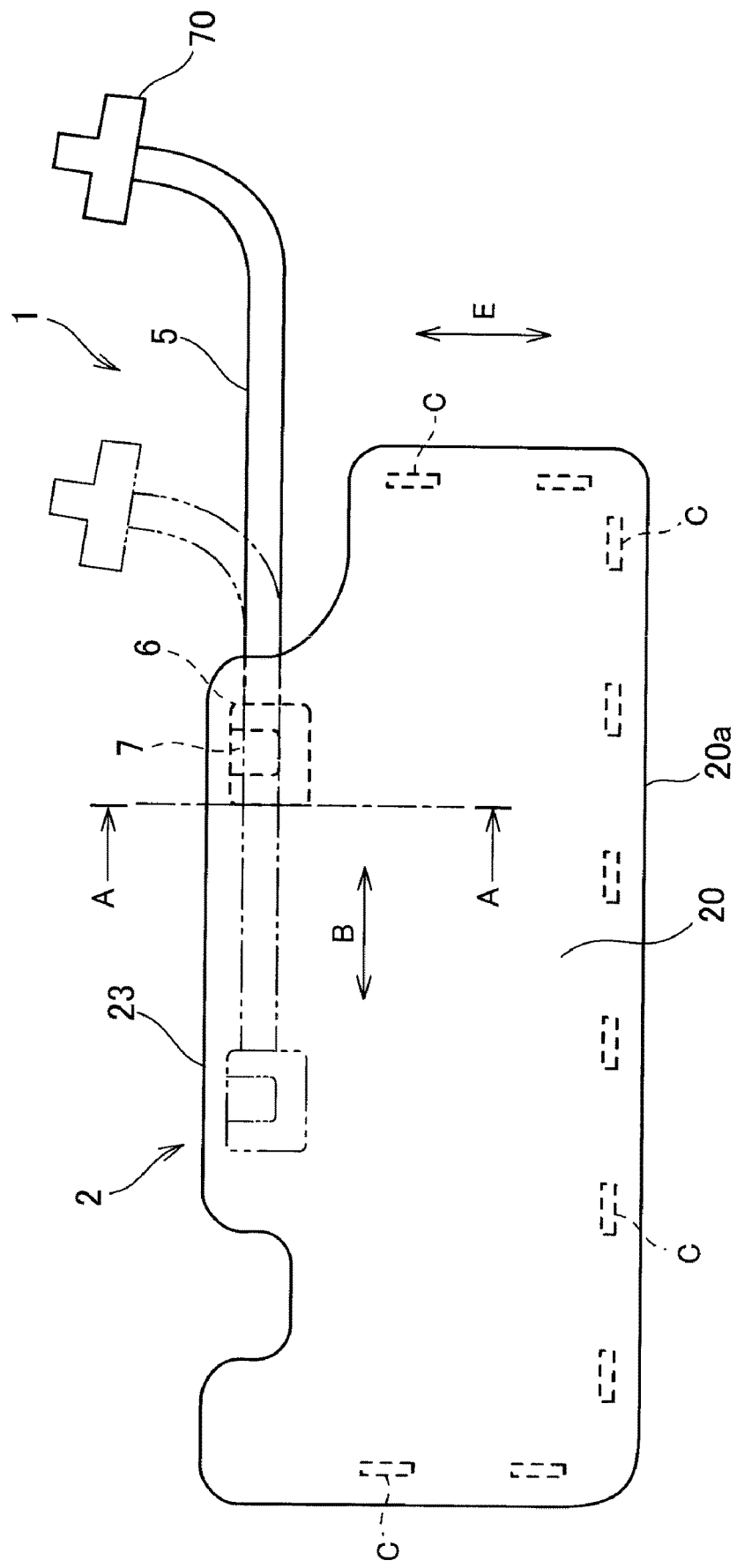
FIG. 1 is an explanatory illustration schematically showing a vehicle sun visor according to the present embodiment.
Figure 2:
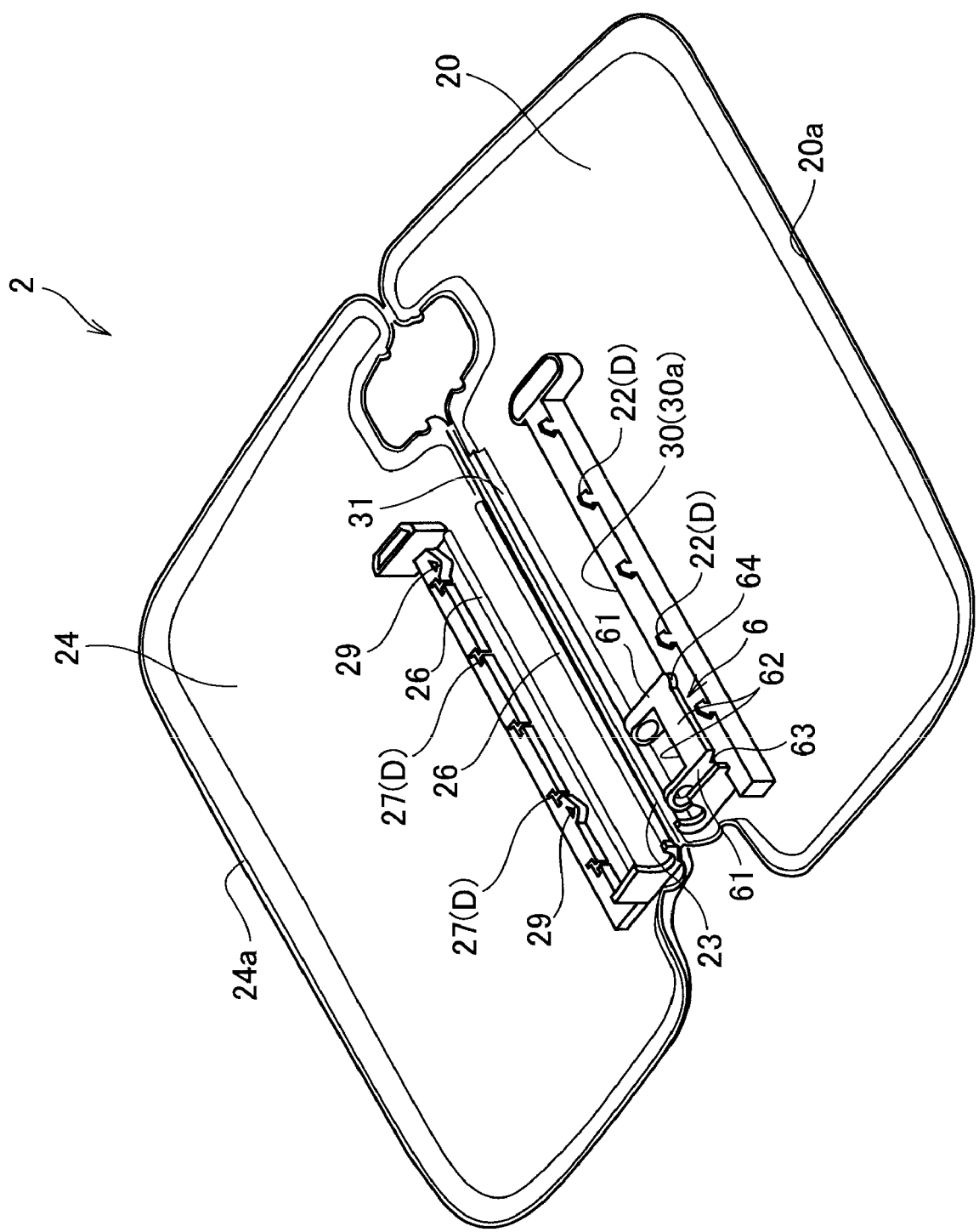
FIG. 2 is an explanatory illustration showing the structure of a sun visor body in an exploded manner.
Figure 3:
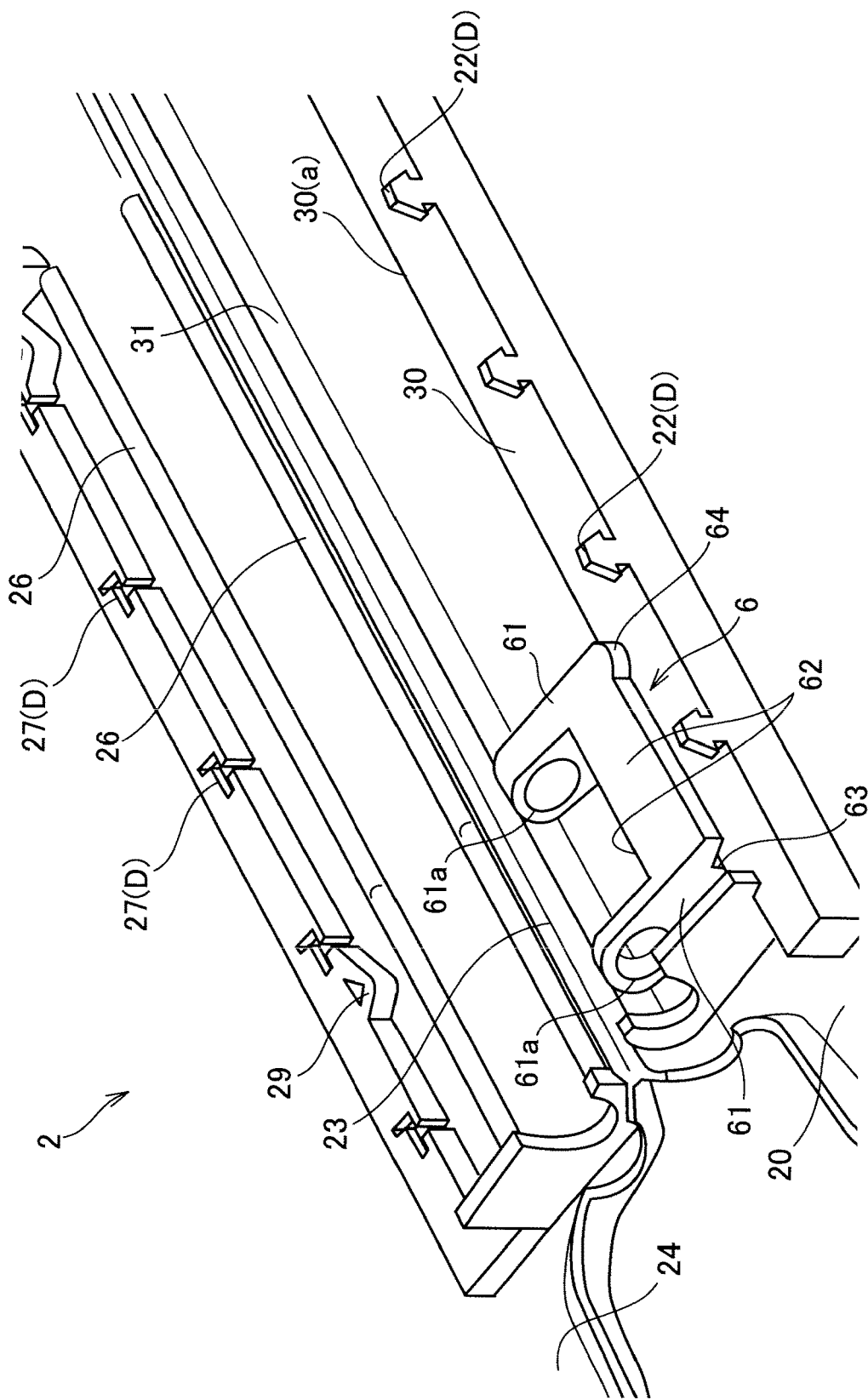
FIG. 3 is an explanatory illustration showing the main part of the sun visor body in FIG. 2 in an enlarged manner.
Figure 4:
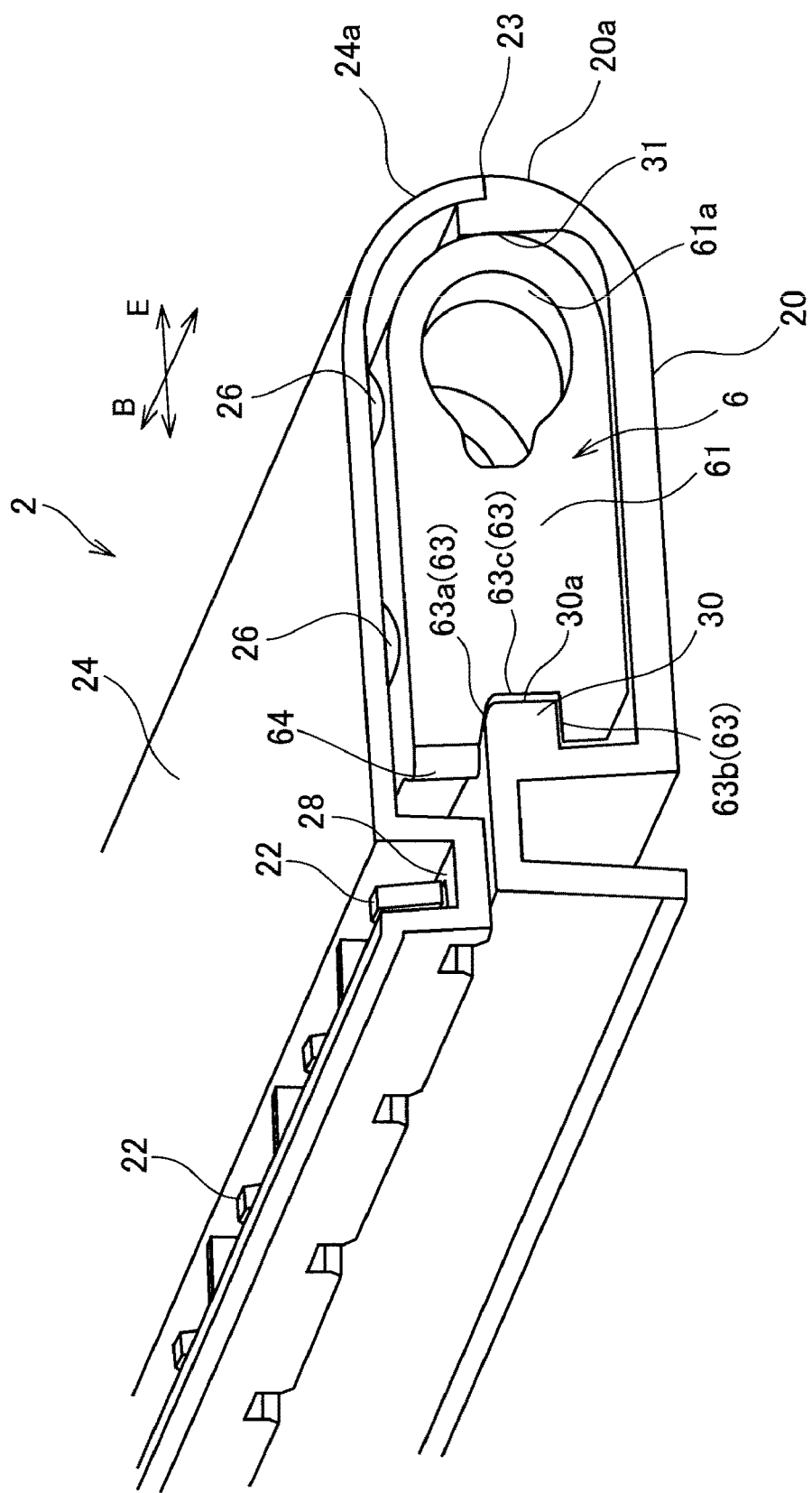
FIG. 4 is an explanatory illustration schematically showing the cross section of the sun visor body taken along line AA in FIG. 1.
Figure 5:
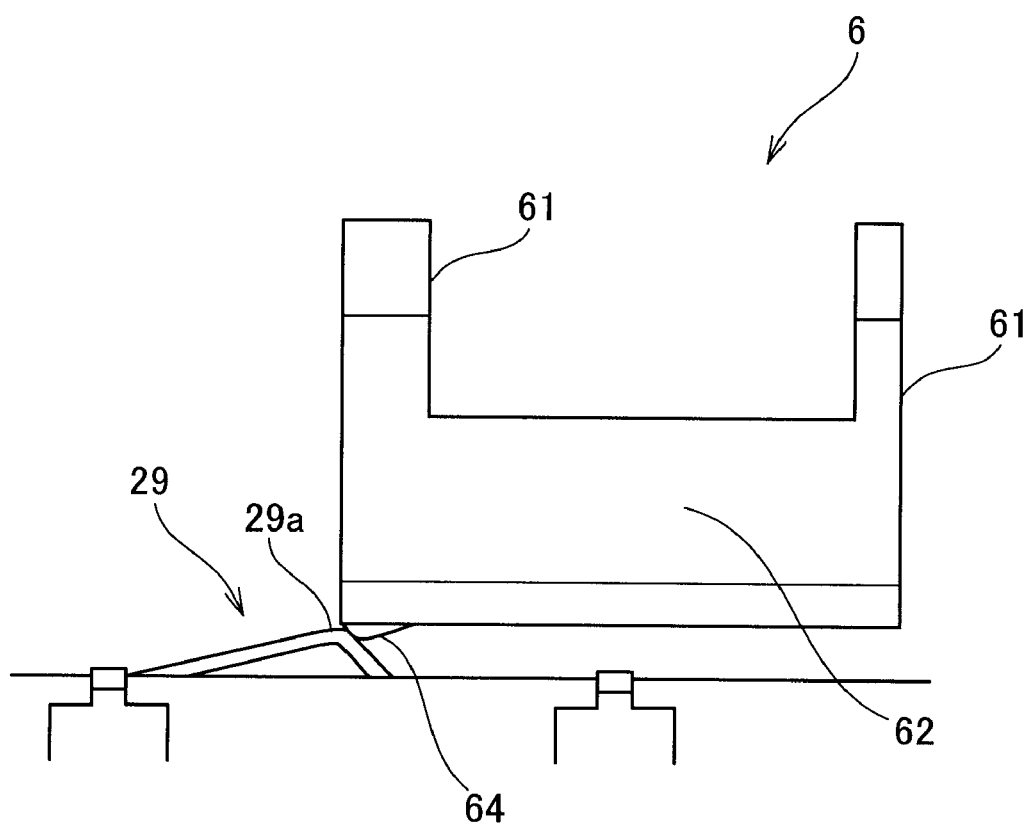
FIG. 5 is an explanatory illustration showing the structure of a lock member in detail.

In the following, a description will be given of a vehicle sun visor 1 according to the present embodiment. FIG. 1 is an explanatory illustration schematically showing the vehicle sun visor 1 according to the present embodiment. FIG. 2 is an explanatory illustration showing the structure of a sun visor body 2 in an exploded manner. FIG. 3 is an explanatory illustration showing the main part of the sun visor body 2 in FIG. 2 in an enlarged manner. FIG. 4 is an explanatory illustration schematically showing the cross section of the sun visor body 2 taken along line AA in FIG. 1. FIG. 5 is an explanatory illustration showing the structure of the lock member 29 in detail.

The vehicle sun visor 1 is mainly formed of the sun visor body 2, a shaft 5, and a support member 6.

The sun visor body 2 is formed of a pair of plate-like core members 20, 24 opposed to each other, and has a hollow structure. Hereinafter, as necessary, the pair of the core members 20, 24 are referred to as a first core member 20 and a second core member 24. The pair of core members 20, 24 is quadrangular as seen in a front view, and formed of a synthetic resin material. The main portion of each of the core members 20, 24 is flat. On the other hand, peripheral parts 20a, 24a of respective core members 20, 24 are curved flange-like. The core members 20, 24 are provided with a thin hinge part 23 at respective one sides (part of the peripheral parts 20a, 24a) extending in the longitudinal direction of the core members 20, 24. The pair of core members 20, 24 is continuous to each other via the hinge part 23. The core members 20, 24 are folded on each other about the hinge part 23, and coupled to each other having their respective peripheral parts 20a, 24a abutted on each other.

The sun visor body 2 has its surface decorated with a decorative sheet (not shown), which decorative sheet may be dispensed with.

The core members 20, 24 are coupled to each other by first engagement parts C. A plurality of first engagement parts C are provided along the peripheral parts 20a. 24a on the inner surfaces of respective core members 20, 24. Each first engagement part C is formed of a first catch part (not shown) provided integrally on the inner surface of the first core member 20, and a first caught part (not shown) provided integrally on the inner surface of the second core member 24 so as to correspond to the first catch part. When the first core member 20 and the second core member 24 are folded on each other about the hinge part 23, the first catch parts and the first caught parts engage with each other. This couples the pair of core members 20, 24 to each other. Note that. FIG. 2 does not illustrate the first catch parts and the first caught parts.

The shaft 5 is a rod-like member for mounting the sun visor body 2 on the vehicle roof part. The shaft 5 is solid, or have wires or terminals for lighting disposed therein. The shaft 5 has its intermediate part bent to be substantially L-shaped. At one end of the shaft 5, a base part 70 fastened thereby fixed to the vehicle roof part is provided. The other end of the shaft 5 is designed to extend straight from its tip by a predetermined length. On the tip side, a support member 6 is mounted. The support member 6 and the other end side of the shaft 5 are housed inside the sun visor body 2 while extending along the edges of the core members 20, 24 where the hinge part 23 is provided.

The support member 6 is a member for allowing the user to rotate and slide the sun visor body 2. The shaft 5 is inserted into the support member 6. By the support member 6 being clipped together with the shaft 5 by the spring clip 7, the support member 6 is fixed to the shaft 5.

The support member 6 is mounted rotatably about the axis of the shaft 5. The support member 6 is embraced by the sun visor body 2, and the user can rotate the sun visor body 2 integrally with the support member 6. Thus, the user can rotate the sun visor body 2 between the stowed position which can be reached by a rotation (rotary movement) so as to set along the roof plane in the cabin and the use position which can be reached by a downward rotation from the stowed position and where the sun visor body 2 is suspended substantially along the windshield. Here, by the frictional resistance between the shaft 5 and the clip 7, predetermined reaction force (rotation torque) occurs against the rotation of the sun visor body 2. Thus, around the stowed position, the sun visor body 2 is flipped up toward the roof plane in the cabin, and the sun visor body 2 retains its attitude along the roof plane. Additionally, when the user rotates the sun visor body 2 between the stowed position and the use position, proper operation reaction force is obtained.

The sun visor body 2 can be rotated in the substantially horizontal direction integrally with the shaft 5 about the base part 70. Thus, the sun visor body 2 can be rotated between the front use position along the windshield and the side use position along the door window.

The support member 6 is mounted on the shaft 5 while being restricted in shifting in the axial direction of the shaft 5 (direction B in FIG. 1). The support member 6 is capable of sliding, by the slide structure, in the sun visor body 2 in the axial direction of the shaft 5. That is, the sun visor body 2 can be relatively slid in the axial direction of the shaft 5. Thus, the range of shielding sunlight can be changed according to the incident direction of sunlight or the driving posture or physique of the driver.

In the following, a detailed description will be given of the slide structure of the vehicle sun visor 1 which is one characteristic of the present embodiment.

In the present embodiment, in a pair of core members 20, 24, the first core member 20 which is one core member 20 includes a pair of guide parts 30, 31. The guide parts 30, 31 are the members configured to hold the support member 6 from both sides and guide the support member 6 in the axial direction of the shaft 5. In the present embodiment, the holding the support member 6 by the pair of guide parts 30, 31 is performed in the top-bottom direction of the support member 6 (direction E perpendicular to the slide direction B with reference to the flat surfaces of the core members 20, 24).

The one guide part 30 is a rib-like member which is provided on the inner surface side of the first core member 20 so as to be parallel to the flat surface of the first core member 20, and extends in the axial direction of the shaft 5 (hereinafter referred to as "the rail member 30"). The length of the rail member 30 (the length in the extending direction) corresponds to the slide range of the sun visor body 2. The rail member 30 has its rail surface 30a opposed to an edge of the first core member 20 (part of the peripheral part 20a) where the hinge part 23 is provided.

The other guide part 31 is opposed to the rail member 30, and abuts on the support member 6 mounted on the rail member 30 (hereinafter referred to as "the abutting part 31"). In the present embodiment, the abutting part 31 is provided along the edge of the first core member 20 where the hinge part 23 is provided, and formed of the inner surface of the peripheral part 20a including the edge. A region of the peripheral part 20a corresponding to the abutting part 31 is formed to be greater in thickness than other region in order to secure the stiffness of the abutting part 31.

The support member 6 is held between the rail member 30 and the abutting part 31 while being enveloped in the sun visor body 2. The support member 6 slides in the axial direction of the shaft 5 while being held from both sides by the rail member 30 and the abutting part 31.

The support member 6 is formed of a pair of end wall parts 61 positioned on the opposite ends with reference to the axial direction of the shaft 5, and a pair of side wall parts 62 coupling the pair of end wall parts 61 to each other so that the side wall parts 62 oppose to the inner surfaces of the core members 20, 24, respectively.

Each of the end wall parts 61 projects upward (on the hinge part 23 side of the core members 20, 24) than the side wall parts 62. To the projecting portion, an insert part 61a for inserting the shaft 5 is provided. The upper end of each end wall part 61 is arc-shaped so as to correspond to the curved shape of the peripheral parts 20a, 24a of the core members 20, 24. On the other hand, at the lower end of each end wall part 61, a groove-like mating part 63 which slidably mates with the rail member 30 is provided.

The mating part 63 includes a pair of sliding walls 63a, 63b configured to hold the rail member 30 from both sides, and a coupling wall 63c coupling the pair of the sliding walls 63a, 63b to each other. Here, one sliding wall 63a has a plane shape inclined relative to the vertical wall surface of the rail member 30. The other sliding wall 63b has a plane shape parallel to the vertical wall surface of the rail member 30.

In the pair of end wall parts 61, at the lower edge of one end wall parts 61, a protruding part 64 protruding downward is formed. The protruding part 64 is configured to retain the support member 6 having slid to the end position in the axial direction of the shaft 5 at the end position.

In the support member 6 structured as described above, the mating part 63 mates with the rail member 30, and the upper ends of the end wall parts 61 abut on the abutting part 31. By being held from the both sides by the rail member 30 and the abutting part 31 and sliding along the rail member 30, the support member 6 can slide in the axial direction of the shaft 5.

When the mating part 63 fits into the rail member 30, the other sliding wall 63b is brought into surface contact with the vertical wall surface of the rail member 30. On the other hand, since the one sliding wall 63a has an inclined surface shape, the one sliding wall 63a is partially brought into contact with the corner of the rail surface 30a of the rail member 30 (the site where the vertical wall surface and the rail surface 30a are continuous to each other).

The rail member 30 exhibits not only the guide function in sliding the sun visor body 2, but also the function of restricting the rotation of the sun visor body 2 about the axis of the shaft 5. Thus, the rotation operation force in the user's vertically rotating the sun visor body 2 is properly transferred to the support member 6, whereby the sun visor body 2 is vertically rotated with excellent operability.

The support member 6 is enveloped in the pair of core members 20, 24, and covered with the core members 20, 24 from both sides. At the inner surface of the second core member 24, projection parts 26 protruding toward the first core member 20 are provided. The projection parts 26 are provided two in number in the present embodiment at the position corresponding to the support member 6. Each projection part 26 extends along the rail member 30, so as to cover the slide range of the support member 6. In the state where the support member 6 is enveloped in the pair of core members 20, 24, the projection parts 26 are in contact with the support member 6.

At the vertical wall surface of the rail member 30, a plurality of second catch parts 22 are provided along the rail member 30. On the other hand, at the second core member 24, a plurality of second caught parts 27 are provided at the positions respectively corresponding to the second catch parts 22. The plurality of second caught parts 27 are formed at the bottom surface of a groove part 28, which is formed as a recess at the second core member 24 along the rail member 30. Each of the second caught parts 27 is formed as an opening having a predetermined shape.

When the first core member 20 and the second core member 24 are folded on each other about the hinge part 23, the second catch part 22 and the second caught part 27 engage with each other. Thus, at the intermediate part of the sun visor body 2 where the rail member 30 exists, the pair of core members 20, 24 is coupled to each other. The second catch part 22 and the second caught part 27 correspond to the second engagement parts D which couple the pair of core members 20, 24 to each other.

Note that, the groove part 28 where the plurality of second caught parts 27 are provided is set to have a depth greater than the length by which the second catch part 22 in the engaging state projects from the bottom surface of the groove part 28. This prevents the second catch part 22 from projecting from the surface of the second core member 24 when the first core member 20 and the second core member 24 are combined with each other.

Corresponding to the protruding part 64 of the support member 6, the second core member 24 is provided with a lock member 29. The lock member 29 is disposed, on the inner surface of the second core member 24, at the site which forms the groove part 28. The lock member 29 is formed of a thin plate-like member, and has its both ends coupled to the second core member 24 and has its intermediate part 29a projected in a convex manner. The projecting amount of the intermediate part 29a is set so that the intermediate part 29a engages with the protruding part 64 of the support member 6. The engagement between the lock member 29 and the protruding part 64 allows the support member 6 to be retained at the end position.

With the sun visor body 2 smoothly sliding, the vehicle sun visor 1 structured as described above provides excellent operability. In order to obtain this operability, the slide resistance occurring between the pair of core members 20, 24 and the support member 6 must be properly adjusted. To this end, the support member 6 must be held between the pair of core members 20, 24 with proper force.

In the present embodiment, the support member 6 is held between the guide parts 30, 31 (the rail member 30 and the abutting part 31), which guide parts 30, 31 are provided on the first core member 20 side. In the case where the members holding the support member 6 between them are respectively provided at the first core member 20 and the second core member 24, the holding force on the support member 6 becomes susceptible to the assembly precision of the first core member 20 and the second core member 24. In this case, the support member 6 is hardly held under an identical condition, and the slide resistance fails to be stabilized.

In this regard, according to the present embodiment, since both of the guide parts 30, 31 are provided on the first core member 20, the holding is less susceptible to the assembly precision of the first core member 20 and the second core member 24. Thus, the support member 6 is held under an identical condition, and the slide resistance is stabilized. Thus, desired operation performance is attained.

In the present embodiment, the guide parts 30, 31 provided at the first core member 20 realize both the function of transferring the rotation operation force in the user's vertically rotating the sun visor body 2 and the function of generating the slide resistance in the user's sliding the sun visor body 2. Accordingly, without the necessity of taking into consideration of the assembly precision with the second core member 24, the rotation operation force and the slide resistance can be adjusted just by the factor of the first core member 20. This eliminates any complicated product design and minimizes manufacture variations, and provides the vehicle sun visor 1 with desired product feature.

In the present embodiment, one sliding wall 63a which forms the mating part 63 of the support member 6 has a surface shape inclined relative to the vertical wall surface of the rail member 30. Accordingly, one sliding wall 63a is partially in contact with the corner of the rail surface 30a of the rail member 30. In the case where the one sliding wall 63a opposes to the vertical wall surface of the rail member 30 in parallel similarly to the other sliding wall 63b, the slide resistance may vary by variations in the distance between the sliding walls 63a, 63b, dimensional variations in the rail width of the rail member 30, or time-course deterioration in use. However, according to the present embodiment, provided that dimensional variations or time-course deterioration occur, there is provided a constant operational environment in which the one sliding wall 63a slides while partially abutting on the rail member 30 (the corner of the rail surface 30a). This minimizes variations in the slide resistance and, hence, desired operation performance is attained.

In the present embodiment, the sun visor body 2 further includes a plurality of second engagement parts D provided at the pair of core members 20, 24 along the rail member 30, each of the second engagement parts D being formed of the second catch part 22 and the second caught part 27 engaging with each other. By the pair of core members 20, 24 being coupled to each other at a certain interval by the second engagement parts D, the stiffness of the sun visor body 2 around the rail member 30 improves. This ensures the straightness of the rail member 30, allowing the user to smoothly operate the support member 6 with a certain operation force. Thus, desired operation performance is attained.

In the present embodiment, the lock member 29 for retaining the support member 6 at the end position is formed of a thin plate-like member which has its both ends coupled and has its intermediate part 29a projected in a convex manner. Accordingly, corresponding to the setting of the height of the intermediate part 29a, the locking force on the support member 6 is easily adjusted. The operability for the user in sliding the support member 6 to the end position of the sun visor body 2 and locking and canceling the locking can be set to a proper state.

In the present embodiment, at the inner surface of the second core member 24, the projection parts 26 are provided so as to cover the slide range of the support member 6 along the rail member 30. By the projection parts 26 being in contact with the side wall parts 62 of the support member 6, any clearance between the pair of core members 20, 24 and the support member 6 is eliminated. This minimizes any rattling when the support member 6 is slid. As a result, desired operation performance is attained.

The foregoing is the description of the vehicle sun visor according to the present embodiment. The present invention is not limited thereto, and various changes may be made within the scope of the invention.

REFERENCE SIGNS LIST 1 vehicle sun visor
2 sun visor body
5 shaft
6 support member
20 core member (first core member)
20a peripheral part
22 second catch part
23 hinge part
24 core member (second core member)
24a peripheral part
26 projection part
27 second caught part
28 groove part
29 lock member
29a intermediate part
30 rail member (guide part)
30a rail surface
31 abutting part (guide part)
61 end wall part
61a insert part
62 side wall part
63 mating part
63a sliding wall
63b sliding wall
63c coupling wall
64 protruding part
70 base part
C first engagement part
D second engagement part

The invention claimed is:

1. A vehicle sun visor comprising:
a sun visor body having a hollow structure formed of a pair of core members opposed to each other;
a shaft configured to support the sun visor body on a vehicle body; and
a support member mounted on the shaft such that the shaft is rotatable about an axis of the shaft while being restricted in shifting in an axial direction of the shaft, wherein
the support member and part of the shaft are housed inside the sun visor body,
one of the core members includes
a rail member extending in the axial direction of the shaft, and
an abutting member provided so as to oppose to the rail member and abut on the support member, and
the rail member and the abutting member hold the support member from both sides, and guide shifting of the sun visor body in the axial direction of the shaft.

2. The vehicle sun visor according to claim 1, wherein
the sun visor body further includes a plurality of engagement parts formed of a catch part and a caught part respectively provided at the pair of core members to engage with each other, the engagement parts being arranged along the rail member.

3. The vehicle sun visor according to claim 1, wherein
the support member includes a mating part being groove-like and slidably fitting to the rail member,
the mating part includes
a pair of sliding walls configured to hold a vertical wall surface of the rail member from both sides, and
a coupling wall coupling the pair of sliding walls to each other, and
one of the sliding walls has a plane shape inclined relative to the vertical wall surface of the rail member.

4. The vehicle sun visor according to claim 1, wherein
the other one of the core members further includes a lock member configured to retain the support member having shifted in the axial direction of the shaft at an end position, and
the lock member is formed of a thin plate-like member having an intermediate part curved in a convex manner.

5. The vehicle sun visor according to claim 2, wherein
the support member includes a mating part being groove-like and slidably fitting to the rail member,
the mating part includes
a pair of sliding walls configured to hold a vertical wall surface of the rail member from both sides, and
a coupling wall coupling the pair of sliding walls to each other, and
one of the sliding walls has a plane shape inclined relative to the vertical wall surface of the rail member.

6. The vehicle sun visor according to claim 2, wherein
the other one of the core members further includes a lock
member configured to retain the support member having shifted in the axial direction of the shaft at an end position, and
the lock member is formed of a thin plate-like member having an intermediate part curved in a convex manner.

7. The vehicle sun visor according to claim 3, wherein
the other one of the core members further includes a lock
member configured to retain the support member having shifted in the axial direction of the shaft an end position, and
the lock member is formed of a thin plate-like member having an intermediate part curved in a convex manner.

\* \* \* \* \*